United States Patent [19]

Aoe et al.

[11] Patent Number: 5,514,406

[45] Date of Patent: May 7, 1996

[54] OIL AND FAT COMPOSITION HAVING DECREASED DIGESTIVE AND ABSORPTIVE PROPERTIES

[75] Inventors: Seiichiro Aoe, Sayama; Sachiko Yahagi, Iwatsuki; Masatoshi Yahiro, Higashimurayama; Toshimitsu Yoshioka, Sayama; Hiroaki Konishi, Kawagoe; Mototake Murakami, Sayama; Masami Kawanari, Kawagoe, all of Japan

[73] Assignee: Snow Brand Milk Products Co., Ltd., Hokkaido, Japan

[21] Appl. No.: 325,309

[22] PCT Filed: Feb. 23, 1994

[86] PCT No.: PCT/JP94/00277

§ 371 Date: Dec. 20, 1994

§ 102(e) Date: Dec. 20, 1994

[30] Foreign Application Priority Data

Feb. 23, 1993 [JP] Japan .................................. 5-057799

[51] Int. Cl.[6] ....................................................... A23D 7/00
[52] U.S. Cl. ................................................ 426/606; 426/607
[58] Field of Search ............................. 426/606–608, 426/549, 580, 590

[56] References Cited

U.S. PATENT DOCUMENTS

| | | | |
|---|---|---|---|
| Re. 34,617 | 5/1994 | Jandacek | 514/23 |
| 4,784,845 | 11/1988 | Desai | 424/80 |
| 4,818,247 | 3/1989 | Desai | 424/80 |
| 5,258,197 | 11/1993 | Wheeler | 426/607 |
| 5,391,383 | 2/1995 | Sullivan | 426/99 |

FOREIGN PATENT DOCUMENTS

| | | |
|---|---|---|
| 57-21498 | 2/1982 | Japan . |
| 62-22547 | 1/1987 | Japan . |
| 62-55040 | 3/1987 | Japan . |
| 62-25340 | 6/1987 | Japan . |
| 63-60977 | 11/1988 | Japan . |
| 6485040 | 3/1989 | Japan . |
| 1187052 | 7/1989 | Japan . |
| 1252248 | 10/1989 | Japan . |
| 312853 | 2/1991 | Japan . |

OTHER PUBLICATIONS

Desrosier 1977 Elements of Food Technology AVI Publishing Co Inc Westport CT pp. 518–519.
Swern 1979 Bailey's Industrial Oil and Fat Products vol. 1, 4th edition John Wiley & Sons New York pp. 332–340, 342–347 349–351, 429–434.
Stecher 1968 The Merck Index Merck & Co. Inc. Rahway NJ p. 1082.
Grant 1969 Hackh's Chemical Dictionary McGraw Hill Book Co. New York p. 693.
Gunstone 1983 Lipids in Foods Chemistry, Biochemistry & Technology Pergamon Press New York pp. 147–155.
Swern 1982 Baileys Industrial Oil & Fat Products vol. 2 4th Edition John Wiley & Sons New York p. 48.
Garti 1982 JAOCS 59(4) 181–185 Crystal Structure Modifications of Tristearin by Food Emulsifiers.
Schlichter 1987 JAOCS 64(4) 529–533 Mechanistic Considerations of Polymorphic Transformations of Tristearin in the presence of emulsifiers.
Schlichter 1986 JAOCS 63(6) 788–791 Heat Capacity of Tristearin in the presence of food emulsifiers.
Selke 1975 JAOCS 52(7)232 Volatile Components from Tristearin Heated in Air.
"Yushi Kagaku Binran"; Nihon Yukagaku Kyokai; pp. 344–346; 1990.
"Digestibility of Fully–Hydrogenated Dietary Soybean Oil and Its Influence on Lipid Metabolism in Rats"; Nihon Eiyo Skokuryoo Gakkai, vol. 47, No. 2, pp. 101–109; 1994; Seiichiro Aoe, et al.
"Digestibility of Certain Higher Saturated Fatty Acids and Triglycerides", Journal of Nutrition, vol. 26, No. 3, pp. 219–255, 1943; R. Hoagland, et al.
"Nutrition and Biochemistry of Trans and Positional Fatty Acid Isomers In Hydrogenated Oils"; Ann. Rev. Nutr. 4, pp. 339–376; E. A. Emken.
"Dispelling Misconceptions With Stable Isotopes"; INFORM, vol. 5, No. 8; Aug. 1994; pp. 906–912; E. A. Emken.
"Yushiseihin No Chishiki", p. 40; 1981; K. Yasuda, et al.
"Nihon Shoni Kagaku Kaishi"; vol. 77; No. 9, pp. 622–635; 1973.
"Triglyceride Configuration And Fat Absorption by the Human Infant"; Jun. 23, 1969; L. Filer, Jr. et al.; pp. 292–298.

*Primary Examiner*—Carolyn Paden
*Attorney, Agent, or Firm*—Townsend & Banta

[57] ABSTRACT

An oil and fat composition having decreased digestive and absorptive properties comprising an oil and fat composition containing 50% or more tristearin is disclosed. In addition, the oil and fat composition is preferably powdered to have a particle size of 100 μm or less. When beverages and foods containing oil and fat are made, nutritive efficiency may be decreased by using the oil and fat composition of the present invention in place of normally ingested oils and fats. Therefore, the oil and fat composition of the present invention is useful as a material for designer's and pharmaceutical foods.

16 Claims, 1 Drawing Sheet

OIL AND FAT COMPOSITION HAVING DECREASED DIGESTIVE AND ABSORPTIVE PROPERTIES

TECHNICAL FIELD

The present invention relates to an oil and fat composition having decreased digestive and absorptive properties. The oil and fat composition having decreased digestive and absorptive properties is useful as a material for designer's and pharmaceutical foods.

Background Art

Conventionally, many oils and fats used for foods are vegetable oils and fats and animal oils and fats, and triglycerides comprising fatty acids having 16 to 20 carbon atoms and 0 to 3 double bonds constitute the typical structure thereof. It is also known that digestion and absorption of oil and fat depend greatly on physical and chemical characteristics of the oil and fat, i.e. such as melting point and constituent fatty acid species. As for the relation between the melting point and digestibility, it is known that digestibility decreased with increasing melting point, for example, with an oil having a melting point of 37° C., digestibility of the oil is 98%. On the contrary, with an oil having a melting point of 52° C., digestibility of the oil is decreased to 79% (YASUDA Kosaku et al., "Yushiseihin no Chishiki", p.40, (1981), published by Saiwai Shobo). addition, the relation between carbon length or degree of unsaturation of constituent fatty acids and the absorption rate has been studied, it has been found that the longer the carbon chain length and the lower the degree of unsaturation, the absorption rate decreases ("Nihon Shoni Kagaku Kaisht", Vol. 77, No. 9, pp. 622–635,(1973)). Moreover, besides the influences of the physical and chemical characteristics of each fatty acid of the digestive and absorptive properties, has also been known that the digestive and absorptive properties are different depending on the combination of constituent fatty acids bonded to glycerin moiety. For example, it has been reported that as for palmitic acid which is saturated fatty acid, one bonded to β position of glyceride structure has better absorptive property than one bonded to α(α') position, but also β-palmitic acid mono glyceride produced in the digestion stage accelerates the absorption of static acid bonded to α(α') position since it has good emulsifying characteristics ('J. Nutrition', Vol. 99, pp. 293–298, (1969)).

In recent years, intake of high-calorie fat among food components is undesirable and development of fat replacers and fat substitute utilizing polysaccharides and proteins have been actively made. However, the development of foods utilizing the above-mentioned differences of digestive and absorptive properties of oils and fats has not been advanced.

The inventors researched and developed so as to have an oil and fat composition having low digestive and absorptive properties, in view of the aforementioned circumstances, and found that by using an oil and fat composition containing a certain amount or more tristearin in which three stearic acids are combined as a constituent fatty acid of triglycerides, the oil and fat composition exhibits much lower digestive and absorptive rate than the digestive and absorptive rate of stearic acid which has been known, and thus completed this invention. Therefore, the object of the present invention is to provide an oil and fat composition having decreased digestive and absorptive properties comprising an oil and fat composition containing a certain amount or more tristearin.

Conventionally, as examples of using a fully hydrogenated oil for food, there are many examples such as one used as a physical properties modifier for mayonnaise having low-temperature resistance (Japanese Examined Patent Publication No. Sho 62-25340), one used as a physical properties modifier for liquid shortening (Japanese Examined Patent Publication No.Hei 3-12853), one used for frozen tempura (Japanese Examined Patent Publication No. Sho 63-60977), one used for low-temperature resistant edible oil and fat (Japanese Examined Patent Publication No. Sho 62-22547) but these examples do not pay attention to the digestive and absorptive properties of oil and fat composition. In addition, a W/O emulsion for cooking using hardened oil as a low-calorie oil and fat (Japanese Unexamined Patent Publication No.Hei 1-187052) has been known. However, In the invention, physical characteristics are Improved by adding hardened oil and oil and fat content of the emulsion are decreased, and as a result, the ingested oil amount are decreased to obtain low-calorie. In addition, a low-calorie oil and fat (Japanese Unexamined Patent Application No.Hei 1-252248) and an oil and fat for animal feed (Japanese Unexamined Patent Application No.Hei 1-85040) have been proposed, but all of them are concerned with triglycerides consisting of saturated fatty acid having 20 or more carbon atoms as constituent fatty acid, and do not pay attention to the usage of oil and fat composition containing a certain amount or more tristearin as a material for a low-calorie oil and fat.

Disclosure of Invention

In the present invention, by using an oil and fat composition containing 50% or more tristearin, digestive and absorptive properties of oil and fat composition were decreased. The oil and fat composition containing 50% or more tristearin of the present invention may be a fully hydrogenated oil obtained by hydrogenating oils such as corn oil, soybean oil, and rape seed oil completely, and further may include fully hydrogenated oils of sunflower oil, safflower oil, high oleic safflower oil or the like. In addition, these oils may be used in a suitable combination.

If 5 to 95% by weight of the oil and fat composition of the present invention is mixed with liquid oil such as soybean oil, corn oil, rapeseed oil(canoe oil), safflower oil, sunflower oil, these mixed oil and fat compositions have solid fat contents corresponding to the contained tristearin amounts in a temperature range from 5° to 45° C., but these compositions do not exhibit compatible eutectic phenomenon or eutectic crystal phenomenon which are often observed when a plurality of oils are mixed. Further, tristearin keeps a solid state in spite of the amount of the mixed liquid oils. Therefore, even if one or more oils are mixed with tristearin and added to foods, the tristearin will function as an indigestible oil.

Moreover, when an oil and fat composition exhibiting a flake or mass solid state at an ordinary temperature is used as a food material, the oil and fat composition must be predissolved and mixed with other materials and emulsified, and a manufacturing method such as a powdery mixture can not be applied. However, by powdering the oil and fat composition containing 50% or more tristearin, the powdery mixture at an ordinary temperature becomes possible and the applicability as a food material is increased.

Namely, the extent of the powdering may be selected freely depending on the object of usage of the oil and fat composition of the present invention, and the powdered oil and fat composition of the present invention may be a food material having the following characteristics depending on the particle size. A powdered oil and fat composition having an average particle size of 5 μm or less has an extremely smooth feel in the mouth even if it is eaten as It is, and may be used conveniently, since even if it is mixed into oil and fat utilizing foods such as ice cream it unifies easily with textures thereof. The powdered oil and fat composition having an average particle size of 5 to 50 μm has a smooth feel to the mouth even if it is eaten as it is, and does not exhibit roughness. The powdered oil and fat composition having an average particle size of 50 to 100 μm exhibits a powdery touch like flour and rough touch when it is eaten as it is, but it may be mixed easily with flour, soft flour, dogtooth violet starch or the like. Even if it kneaded into dough for cookies or bread or the like and baked, a similar texture and feel to the mouth be obtained. If an average particle size of the powdered oil and fat composition exceeds 100 μm, though it exhibits characteristics as a particle, the rough touch is remarkable and the composition does not disperse uniformly when powdery mixing is tried. As a result, if it is kneaded into the dough of cookies or bread or the like and baked, the eating texture is poor and blot or blooming produces on the surface of the foods, and it is not appropriate for use as a food material.

In the present invention, the aforementioned fully hydrogenated oil is purified in accordance with a conventional method, and it is used as it is, or if it is solidified and, it is dissolved at a sterilizing temperature or more, e.g., 100° C. or more. Then the oil and fat composition is powdered using a powdering method such as a spray cooling method using an atomizer such as a pressure nozzle or double-fluid nozzle, and a mechanical grinding method using a ball mill or a jet mill, but among the powdering method, the spray cooling method using a double-fluid nozzle type of atomizer is useful as a method for obtaining oil and fat composition which is very fine and has a narrow particle size distribution. In the spray cooling method a chamber for cooling sprayed liquid, a cyclone connected to it, a bag filter separator and pressure nozzle for spraying liquid designed to be heated, preferably air atomizing nozzle are used. The temperature of the pressured air heated in the spray cooling process is preferably slight higher than the melting point of the oil used. The pressure is very important to control the particle size in powdering the oil and fat composition, and the particle size of the oil and fat composition may be decreased by increasing the pressure. For example, by spraying the oil and fat composition dissolved by heating at the melting point or more, preferably at 85° to 95° C. from an inner tube of an air atomizing nozzle (nozzle diameter is about 8 mm) at a constant flow rate (about 1.5 L/min), and at the same time, ventilating pressured air (90 L/min) from the external tube of the air atomizing nozzle (nozzle diameter is about 25 mm), the oil and fat composition may be made into fine droplets. Further, the droplets come into contact with gas or liquid such as e.g., air, nitrogen gas or water, alcohol at 0° to 25° C., preferably at 10° C. or less, and are cooled and solidified to produce a powdered oil and fat composition having an average particle size of about 8.5 μm.

When the oil and fat composition of the present invention is used as a food material, the composition has more preferable forms depending on the kind of foods by powdering it to give a particle size of 100 μm or less, preferably 10 μm or less. For example, by replacing a part of the oil phase of a W/O type margarine with the oil and fat composition of the present invention, it may be utilized as a W/0 type fat spread appropriate for diet. Further, in a formula of a spread dough type cookie or a squeeze dough type sable, by replacing a part of the butter with the oil and fat composition of the present invention, cookies or sable having low in calories and has a comparible taste. Alternatively, in processing cereals for breakfast with an extruder, by replacing a part or all of the oil and fat mixed into raw materials with the powdered oil and fat composition of the present invention, the raw materials and the powdered oil and fat composition may be mixed as they are and fed into the extruder, and further low-calorie cereals may be prepared having a texture to the mouth feel of oils and fats since a processing at a high temperature is carried out. Further, by adding the powdered oil and fat composition of the present invention to degreased powder milk and emulsifying them, a milk product having low-calorie and a taste similar to fresh milk may be obtained.

BEST MODE FOR CARRYING OUT THE INVENTION

Figure 1:
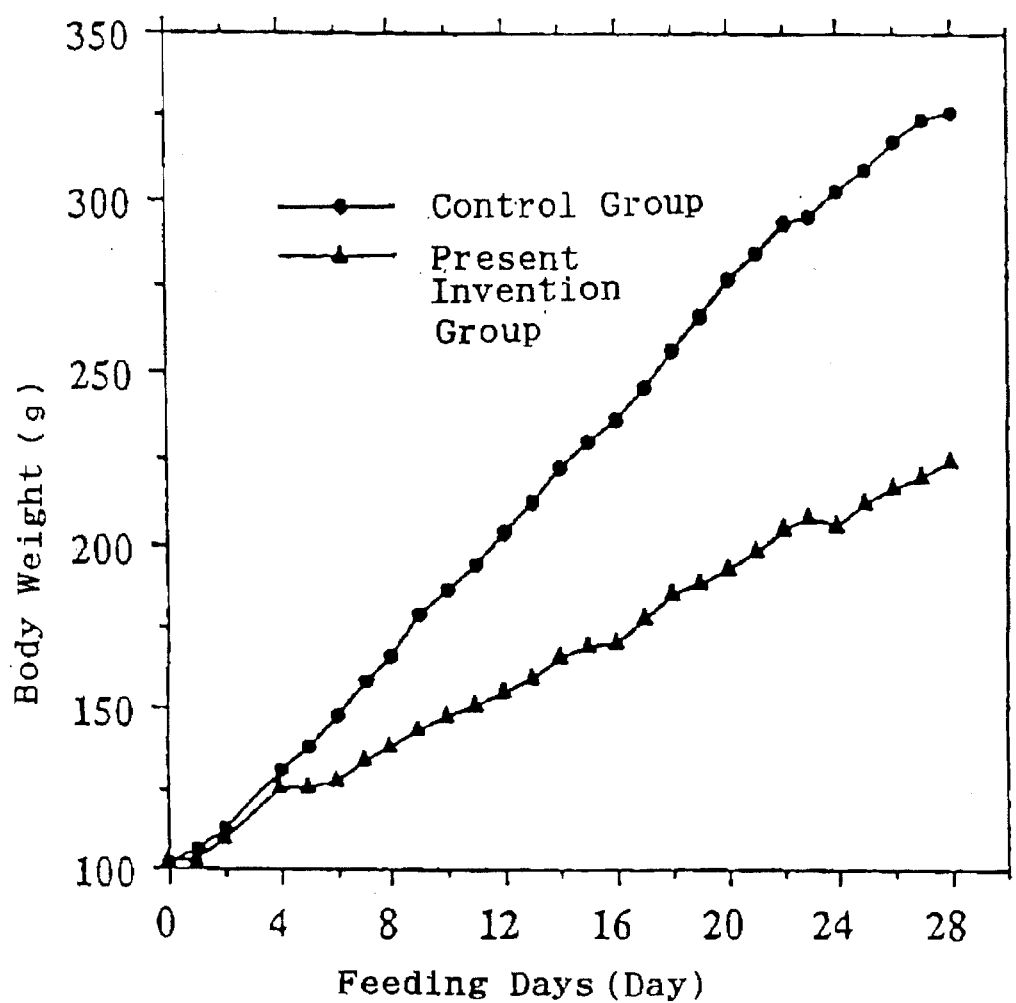
FIG.1 shows the body weight changes of rats in the Test Example.

The present invention will be explained in more detail by way of the following Examples.

EXAMPLE 1

Using a commercially available fully hydrogenated soybean oil obtained by hydrogenating purified soybean Shirashlme-yu (tempura oil) completely by a conventional method, an oil and fat composition was powdered. Fully hydrogenated soybean oil (m.p. 70° C.) maintained at 90° C. was sprayed at a flow rate of 1,800 ml/min from an inner tube of a air atomizing nozzle, and pressurized air heated at 90° C. was sprayed at a flow rate of 24 ml/min from an external tube of the air atomizing nozzle, as a jet flow respectively, into an air a flow made by flowing air cooled to 4° C. at flow rate of 8 ml/min in a spray chamber. Thus, the powdered fully hydrogenated soybean oil was cooled In a moment and solidified. The powdered fully hydrogenated soybean oil was carried to a cyclone by way of air cooled to 4° C. and recovered. The average particle size of the powdered fully hydrogenated soybean oil thus obtained was 15 μm. In addition, the constituent fatty acids of the powdered fully hydrogenated soybean oil were 90.0% stearic acid, 9.1% palmitic acid, 0.2% arachidic acid and 0.7% elaidic acid, and it had 64% tristearin.

EXAMPLE 2

After hydrogenating corn oil under hydrogen atmosphere with nickel catalyst at 120° to 200° C. for 60 minutes, the nickel catalyst was removed and an oil and fat composition was powdered using the bleached hardened corn oil. The hardened corn oil (m.p. 65° C.) maintained at 90° C. was sprayed at a flow rate of 1,800 ml/min from an inner tube of air atomizing nozzle, and pressurized air heated at 90° C. was sprayed at a flow rate of 24 ml/min from an external tube of the air atomizing nozzle, as a Jet flow respectively, into an air flow made by flowing air cooled to 4° C. at a flow rate of 8 ml/min in a spray chamber. Thus the powdered hardened corn oil was cooled in a moment and solidified. The powdered hardened corn oil was carried to a cyclone by way of air cooled at 4° C. and recovered. The average particle size of the powdered hardened corn oil thus obtained was 15 μm. In addition, constituent fatty acids of the powdered hardened corn oil were 88.0% stearic acid, 11.1% palmitic acid and 0.9% elaidic acid, and it had 72% tristearin.

EXAMPLE 3

Using an oil and fat composition derived from β carotene added soybean oil containing 90.0% stearic acid, 8.0% palmitic acid, 0.8% oleic acid and 1.2% elaidic acid as constituent fatty acids and containing 69% tristearin, a low-calorie ice milk having 10% fat content according to a conventional method was prepared. First, 5% the oil and fat composition derived from β carotene added soybean oil was melted at 90° C. in an ice milk mix having 5% fat content, and after emulsifying it at 85° C. or more, it was hardened via a freezing process to have ice milk. Thus obtained ice milk had good flavor, color and texture, and had an equivalent quality to the usual ice milk having 10% fat content prepared as a control.

EXAMPLE 4

Using an oil and fat composition derived from rapeseed oil containing 92.0% stearic acid, 3.0% palmitic acid. 2.0% arachidic acid and 1.0% behenic acid as constituent fatty acids and containing 73% tristearin, low-calorie cookies were prepared. 90 parts sugar were added to 30 parts lightly whipped butter and were creamed, and to which meringue prepared by whipping 60 parts egg white and a small amount of vanilla flavor were added, and stirred to produce a cream. Then a mixture of 30 parts of the oil and fat composition derived from rapeseed oil powdered to have an average particle size of 19 μm added to 100 parts sieved soft flour was mixed into the cream lightly to produce cookie dough. A baking sheet was spread over a tin-pan and the cookie dough was cut into a rubber mold having 25 rectangular holes having a size of 35 mm in length, 50 mm in width and 2 mm in height, and shaped and baked in a pre-heated oven at 200° C. for 5 to 7 minutes to have langue-de-chat type cookies having good texture and taste.

The effect of the present invention will be explained in more detail by way of the following Test Example.

TEST EXAMPLE

A feed in which 95% oil and fat (corresponding to 19%) of a basic control feed containing 20% soybean oil was replaced with the powdered fully hydrogenated soybean oil obtained in Example 1 was used as a test feed. In the test, 4 weeks old. SD strain male rats (Nippon Charles River Co.) were used and they were divided into two groups each containing 18 rats and they were fed for four weeks with the test feeds listed in Table 1. For four days from the beginning of the feeding, rats of both groups took the feed freely and after they got used to the feed, they were fed so that the ingestion amounts of the two groups were equal.

TABLE 1

|  | Control Group | Present Invention Group |
| --- | --- | --- |
| Casein | 20.0% | 20.0% |
| DL-Methionine | 0.3% | 0.3% |
| Soybean Oil | 20.0% | 1.0% |
| Powdered Fully Hydrogenated |  |  |
| Soybean Oil | — | 19.0% |
| Salts Mix | 3.5% | 3.5% |

TABLE 1-continued

|  | Control Group | Present Invention Group |
| --- | --- | --- |
| Vitamins Mix | 1.0% | 1.0% |
| Choline Bitartrate | 0.2% | 0.2% |
| Cellulose | 5.0% | 5.0% |
| Corn Starch | 15.0% | 15.0% |
| Sucrose | 35.0% | 35.0% |
| Calorie (kJ/g) | 19.1 | 19.1 |

The salts mix and the vitamins mix were prepared according to the AIN-76 formula.

Calorie calculations of the test feeds were carried out using the values of 16.8 kJ/g (starch, carbohydrate, and protein) and 37.6 kJ/g (fat).

During the test period, the ingested feed amounts and body weights were measured and increased body weights, ingested calorie amounts and feed efficiencies were calculated. The increased body weights and feed efficiencies are shown in Table 2 and the body weight changes during the test period are shown in FIG.1.

TABLE 2

|  | Control Group | The Present Invention Group |
| --- | --- | --- |
| Ingested Calorie Amount (kJ/day) | 318.6 ± 24.6 | 322.5 ± 6.1 |
| Increased Body Weight (g/day) | 8.0 ± 0.7 | 4.4 ± 0.2* |
| Feed Efficiency (%) | 48.2 ± 2.6 | 25.8 ± 1.2* |

The value shows average value±standard deviation and * shows significant difference from the control group with 1% of significance level.

As the results show, each of the increased body weights and feed efficiencies were remarkably controlled to 55% and 54%, respectively though the ingested calorie amounts were the same in the test group.

Industrial Applicability

When beverages and foods containing oil and fat are made, nutritive efficiency may be decreased by using an oil and fat composition having decreased digestive and absorptive properties comprising an oil and fat composition containing 50% or more tristearin of the present invention in place of normally ingested oils and fats. Therefore, the oil and fat composition having decreased digestive and absorptive properties of the present Invention is useful as a material for designer's and pharmaceutical foods.

We claim:

1. A low-calorie breakfast cereal having decreased digestive and absorptive properties, comprising a cereal in which a part or all of oil and fat in said cereal has been replaced by an oil and fat comprising about 50% or more tristearin.

2. A low calorie breakfast cereal having decreased oil and fat digestive and absorptive properties as in claim 1, wherein the oil and fat composition is powdered to have a particle size of about 100 μm or less.

3. A low calorie margarine having decreased oil and fat digestive and absorptive properties comprising a margarine in which a part or all of the oil and fat in said margarine has been replaced by an oil and fat comprising about 50% of tristearin.

4. A low calorie margarine having decreased oil and fat digestive and absorptive properties as in claim 3, wherein the oil and fat composition is powdered to have a particle size of about 100 μm or less.

5. A low calorie dessert having decreased oil and fat digestive and absorptive properties comprising ice milk in which a part or all of the oil and fat in said ice milk comprises about 50% of tristearin.

6. A low calorie dessert having decreased oil and fat digestive and absorptive properties as in claim 5, wherein the oil and fat composition is powdered to have a particle size of about 100 μm or less.

7. A low calorie bakery product containing a component selected from the group consisting of flour, soft flour, and dogtooth violet starch which has decreased oil and fat digestive and absorptive properties comprising said component in a bakery product in which a part or all of oil and fat in said bakery product comprises about 50% of tristearin.

8. A low calorie bakery product having decreased oil and fat digestive and absorptive properties as in claim 7, wherein the oil and fat composition is powdered to have a particle size of about 100 μm or less.

9. A low calorie bakery product of claim 7, wherein the product is a cookie.

10. A low calorie bakery product of claim 9, wherein the cookie is a spread dough-type cookie.

11. A low calorie bakery product of claim 9, wherein the cookie is a squeeze dough-type cookie.

12. A low calorie bakery product of claim 7, wherein the bakery product is bread.

13. A low calorie beverage having decreased oil and fat digestive and absorptive properties, comprising water, and oil and fat, wherein the oil and fat comprises about 50% of tristearin.

14. A low calorie milk product having decreased oil and fat digestive and absorptive properties, comprising a powdered milk which is mixed and emulsified with an oil and fat comprising about 50% or more of tristearin.

15. A low calorie milk product having decreased oil and fat digestive and absorptive properties as in claim 14, wherein the oil and fat composition is powdered to have a particle size of about 100 μm or less.

16. A low calorie food or beverage in which a part or all of original oil and fat has been removed an replaced by an oil and fat composition comprising at least about 50% or more of tristearin.

* * * * *